(12) United States Patent
Wong et al.

(10) Patent No.: US 9,076,340 B2
(45) Date of Patent: Jul. 7, 2015

(54) VEHICLE DETECTING SYSTEM AND METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Shih-Fang Wong, New Taipei (TW); Xin Lu, Shenzhen (CN); Fei Wang, Shenzhen (CN); Huan-Huan Zhang, Shenzhen (CN); Dan Cao, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 98 days.

(21) Appl. No.: 14/037,396

(22) Filed: Sep. 26, 2013

(65) Prior Publication Data
US 2014/0320320 A1 Oct. 30, 2014

(30) Foreign Application Priority Data
Apr. 26, 2013 (CN) .......................... 2013 1 0148260

(51) Int. Cl.
*G08G 1/01* (2006.01)
*G08G 1/16* (2006.01)
*G06K 9/00* (2006.01)

(52) U.S. Cl.
CPC .......... *G08G 1/167* (2013.01); *B60R 2300/8093* (2013.01); *G06K 9/00805* (2013.01)

(58) Field of Classification Search
CPC .................. G06K 9/00805; B60R 2300/8093; G01S 13/931
USPC ................... 340/935, 903, 435, 436; 701/301
See application file for complete search history.

(56) References Cited

U.S. PATENT DOCUMENTS

| | | | |
|---|---|---|---|
| 6,791,471 B2 * | 9/2004 | Wehner et al. | 340/903 |
| 6,993,159 B1 * | 1/2006 | Ishii et al. | 382/104 |
| 7,796,081 B2 * | 9/2010 | Breed | 340/903 |
| 8,885,039 B2 * | 11/2014 | Jang et al. | 340/903 |
| 2003/0055563 A1 * | 3/2003 | Jonas Lars et al. | 701/301 |
| 2008/0205706 A1 * | 8/2008 | Hongo | 382/104 |
| 2014/0063248 A1 * | 3/2014 | Sakagami et al. | 348/148 |
| 2014/0278059 A1 * | 9/2014 | Gunther | 701/414 |

* cited by examiner

*Primary Examiner* — John A Tweel, Jr.
(74) *Attorney, Agent, or Firm* — Novak Druce Connolly Bove + Quigg LLP

(57) ABSTRACT

A vehicle detecting system, a vehicle detecting method adapted for a vehicle, and a computer-readable storage medium encoded with a computer program are disclosed. The system controls two cameras to capture images in the front of the vehicle and at the back of the vehicle respectively, according to a speed and a direction of the vehicle. The system further determines whether or not two images from each camera are the same, if the two images from each camera are different, the vehicle is in a dangerous driving condition, and when times of the dangerous driving condition within a preset time period reaches a preset value, the system outputs a warning to prompt a driver.

18 Claims, 3 Drawing Sheets

VEHICLE DETECTING SYSTEM AND METHOD

BACKGROUND

1. Technical Field

The disclosure relates to driving monitoring technology and, more particularly, to a vehicle detecting system and a vehicle detecting method adapted for a vehicle.

2. Description of Related Art

Some drivers would like to overtake other vehicles or change lanes, especially when the traffic is heavy, which results in many accidents.

Therefore, what is needed is a vehicle detecting system to overcome the described shortcoming.

DETAILED DESCRIPTION

Figure 1:
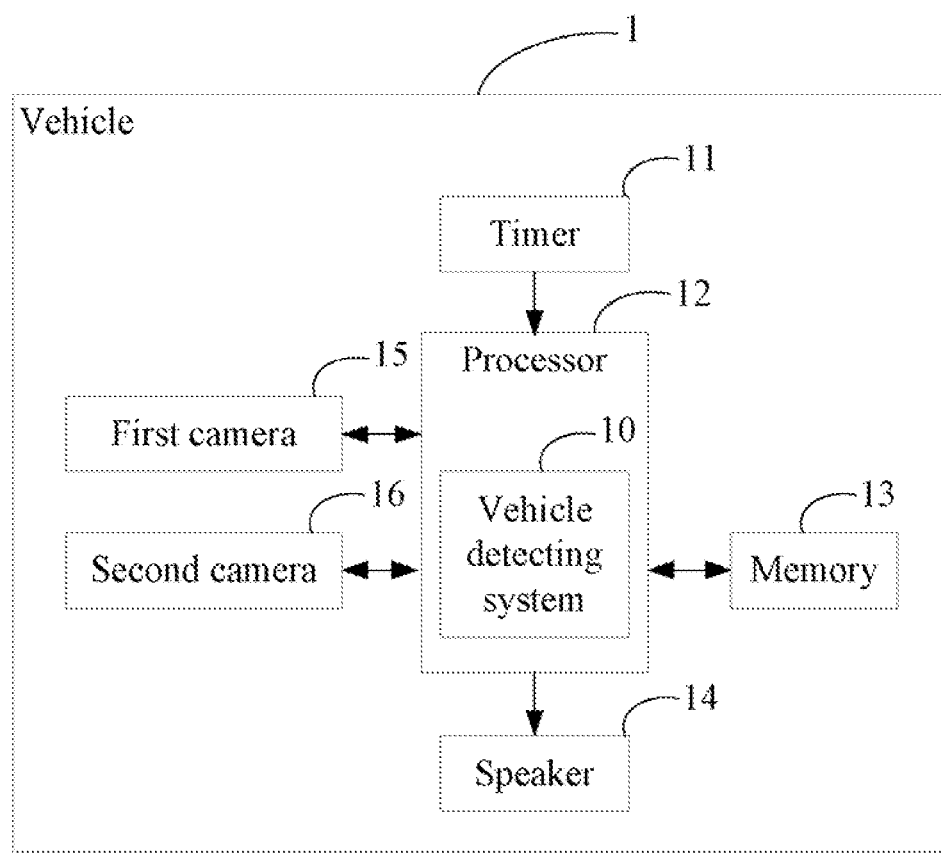
FIG. 1 is a block diagram of a vehicle including a vehicle detecting system in accordance with an exemplary embodiment.

FIG. 1 is a block diagram of a vehicle including a vehicle detecting system in accordance with an exemplary embodiment. In the embodiment, the vehicle detecting system 10 is applied in a vehicle 1. In another embodiment, the vehicle detecting system 10 is used in a portable electronic device, such as a mobile phone. When a user of the mobile phone is driving the vehicle 1, the mobile phone is located in the vehicle 1 and is utilized to capture an image in the front of the vehicle 1.

The vehicle 1 includes a timer 11, a processor 12, a memory 13, a speaker 14, a first camera 15, and a second camera 16. In another embodiment, both the mobile phone and the vehicle 1 communicate and transfer data to each other, one of the first camera 15 and the second camera 16 is located in the vehicle 1, the other camera is located in the mobile phone, and the mobile phone includes the timer 11, the processor 12, the memory 13, and the speaker 14.

The timer 11 measures time. The processor 12 controls the vehicle 1 to work and perform the vehicle detecting system 10. The memory 13 stores data. The speaker 14 outputs sound. Both the first camera 15 and the second camera 16 respectively capture an image. The first camera 15 captures the image in the front of the vehicle 1 and the second camera 16 captures the image at the back of the vehicle 1.

Figure 2:
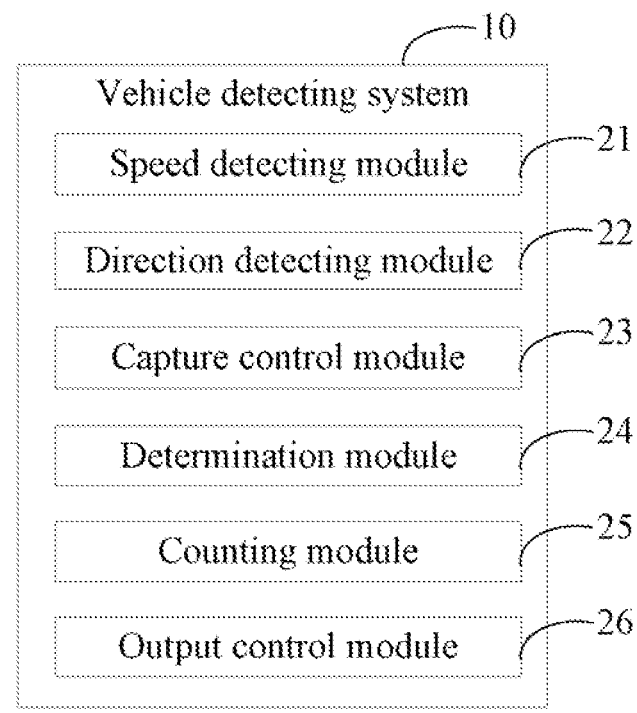
FIG. 2 is a block diagram of the vehicle detecting system of FIG. 1.

As shown in FIG. 2, the vehicle detecting system 10 further includes a speed detecting module 21, a direction detecting module 22, a capture control module 23, a determination module 24, a counting module 25, and an output control module 26, all of which are a collection of software instructions and executed by the processor 12.

The speed detecting module 21 detects a speed of the vehicle 1 at real time. For example, the speed detecting module 21 is an accelerator which detects a change of the speed of the vehicle 1. The timer 11 starts to measure time if the speed of the vehicle changes. When a change of the speed within a first predefined time period is greater than a preset value, the direction detecting module 22 detects a direction of the vehicle 1. The first predefined time period is five seconds and the preset value is thirty kilometer per hour. For example, the speed of the vehicle 1 changes from 10 kilometer per hour to 45 kilometer per hour within five seconds, the change of the speed is equal to 35 kilometer per hour which is greater than the preset value, and the direction detecting module 22 detects the direction of the vehicle 1. For example, the direction detecting module 22 is a gyroscope.

When the direction of the vehicle 1 is not changed all the time or a change of the direction is small all the time, such as five degrees, it is regarded that the vehicle 1 is in a safe driving condition. When a change of the direction is greater than a preset angle (e.g. forty five degree angle), the capture control module 23 sends a first control signal to control the first camera 15 to capture a first image in the front of the vehicle 1 and the second camera 16 to capture a second image at the back of the vehicle 1. Generally, the vehicle 1 is regarded as in a safe driving condition before the change of the direction, both the first camera 15 and the second camera 16 captures the first image and the second image in the safe driving condition. For example, the image includes a license number, such as the license number of a second vehicle in the front of the vehicle 1 or at the back of the vehicle 1.

When the direction is adjusted to the direction in the safe driving condition after the change, that is, the vehicle 1 returns to the safe driving condition, the capture control module 23 further sends a second control signal to control the first camera 15 to capture a third image in the front of the vehicle 1 and the second camera 16 to capture a fourth image at the back of the vehicle 1.

The determination module 24 determines whether or not the two images from the first camera 15 are the same and the two images from the second camera 16 are the same and thus determines whether the vehicle 1 underwent a safe driving condition or a dangerous driving condition. For example, the first image "A1" captured by the first camera 15 when the direction of the vehicle 1 changes is compared with the third image "A2" captured by the first camera 15 after the direction of the vehicle 1 is adjusted, to determine whether or not the first image "A1" and the third image "A2" are the same, and the second image "B1" captured by the second camera 16 when the direction of the vehicle 1 changes is compared with the fourth image "B2" captured by the second camera 16 after the direction of the vehicle 1 is adjusted, to determine whether or not the second image "B1" and the fourth image "B2" are the same.

In another embodiment, the vehicle detecting system 10 is applied in the mobile phone. The mobile phone includes the first camera 15 for capturing the image in the front of the vehicle 1. The second camera 16 is located in the vehicle 1, such as a visual apparatus, the second camera 16 captures the image at the back of the vehicle 1 and sends the image to the mobile phone.

If the two images from both the first camera 15 and the second camera 16 are the same, or one of the two images from the first camera 15 and the two images from the second camera 16 are the same, the vehicle 1 may be in the safe driving condition. If the two images from both the first camera 15 and the second camera 16 are different, that is, the user drives the vehicle 1 to overtake other vehicles or change lanes. The counting module 25 records a dangerous driving condition of the vehicle and records times of the dangerous driving condition within a second predefined time period (e.g. two hours). In the embodiment, the dangerous driving condition includes that the vehicle was overtaking other vehicles or changing lanes.

When the dangerous driving of the vehicle 1 reaches a preset number of times (e.g. ten times) within the second predefined time period, that is, the vehicle 1 frequently overtakes other vehicles or changes lanes, the output control module 26 controls the speaker 14 to output a warning to prompt the driver. For example, the output control module 26 controls the speaker 14 to output a warning sound "caution, be careful".

Figure 3:
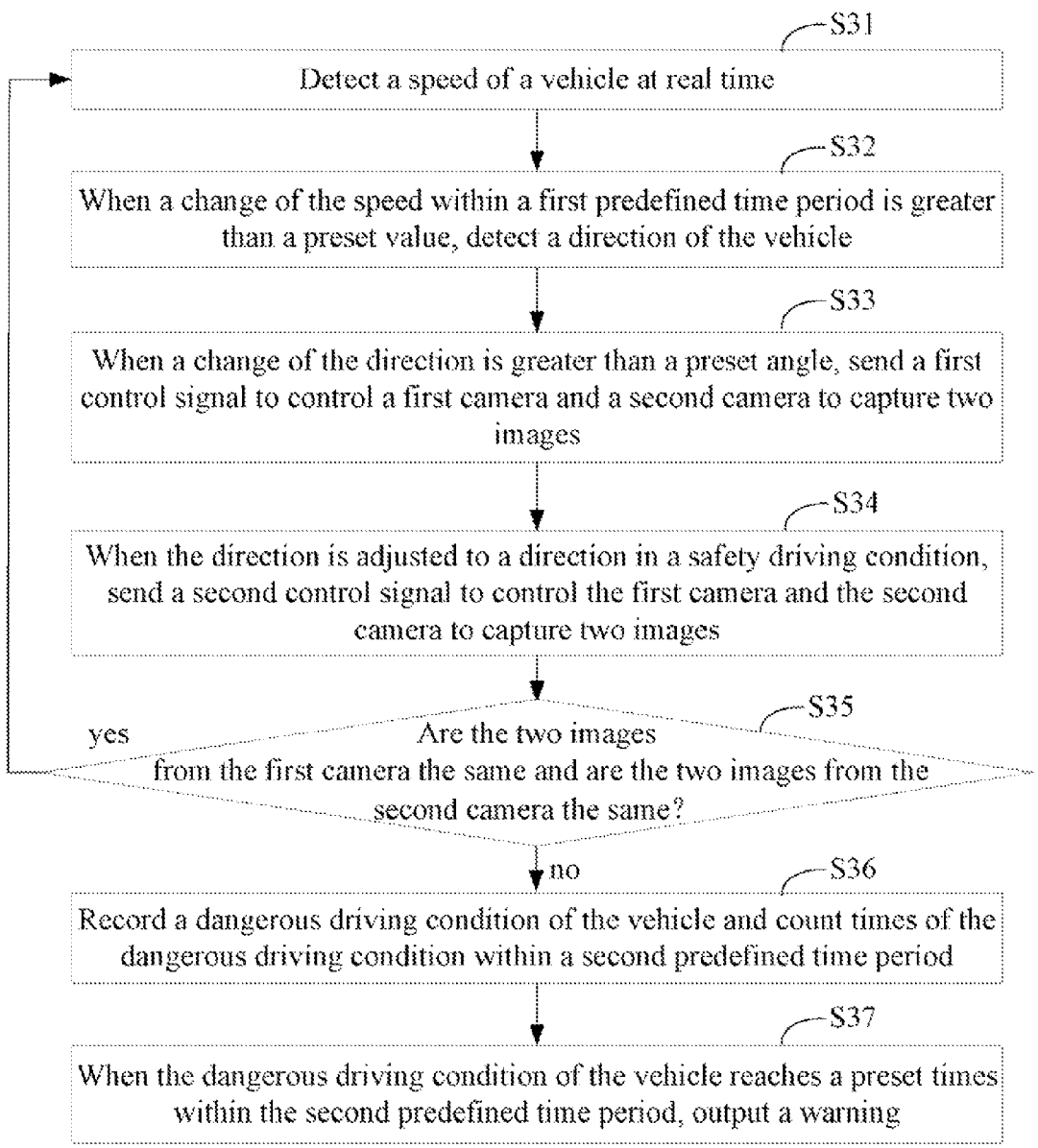
FIG. 3 is a flowchart illustrating a method of detecting a vehicle in accordance with an exemplary embodiment.

FIG. 3 is a flowchart illustrating a method of detecting a vehicle 1. In step S31, the speed detecting module 21 detects a speed of the vehicle 1 at real time. In step S32, when a change of the speed within the first predefined time period is greater than the preset value, the direction detecting module 22 detects a direction of the vehicle 1.

In step S33, when a change of the direction is greater than the preset angle, the capture control module 23 sends a first control signal to control the first camera 15 to capture a first image in the front of the vehicle 1 and the second camera 16 to capture a second image at the back of the vehicle 1. In step S34, when the direction is adjusted to the direction in the safe driving condition, the capture control module 23 further sends a second control signal to control the first camera 15 to capture a third image in the front of the vehicle 1 and the second camera 16 to capture a fourth image at the back of the vehicle 1.

In step S35, the determination module 24 determines whether or not the two images from the first camera 15 are the same and the two images from the second camera 16 are the same. If the two images from both the first camera 15 and the second camera 16 are the same, or one of the two images from the first camera 15 and the two images from the second camera 16 are the same, the vehicle 1 may be in the safe driving condition, and the procedure returns to the step S31.

In step S36, if the two images from both the first camera 15 and the second camera 16 are different, the counting module 25 records a dangerous driving condition of the vehicle and counts times of the dangerous driving condition within the second predefined time period. In step S37, when the dangerous driving condition of the vehicle reaches the preset times within the second predefined time period, the output control module 26 controls the speaker 14 to output a warning to prompt the driver.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A vehicle detecting system for a vehicle, the system comprising:
   one or more processors; and
   a plurality of modules to be executed by the one or more processors, the modules comprising:
   a speed detecting module to detect a speed of the vehicle at real time;
   a direction detecting module to detect a direction of the vehicle when a change of the speed within a first predefined time period is greater than a preset value;
   a capture control module to control a first camera to capture a first image in the front of the vehicle and a second camera to capture a second image at the back of the vehicle when a change of the direction is greater than a preset angle, and control the first camera to capture a third image in the front of the vehicle and the second camera to capture a fourth image at the back of the vehicle when the direction is adjusted to a direction in a safe driving condition, wherein the vehicle is regarded as in the safe driving condition before the change of the direction, and both the first camera and the second camera captures the first image and the second image in the safe driving condition;
   a determination module to determine whether or not the two images from the first camera are the same and the two images from the second camera are the same;
   a counting module to record a dangerous driving condition of the vehicle when the two images from both the first camera and the second camera are different, and count times of the dangerous driving condition within a second predefined time period; and
   an output control module to output a warning to prompt a driver when the times of the dangerous driving condition of the vehicle with the second predefined time period reaches a preset number of times.

2. The vehicle detecting system of claim 1, wherein the image comprises a license number.

3. The vehicle detecting system of claim 1, wherein the safe driving condition comprises that the direction of the vehicle is not changed or a change of the direction is small all the time.

4. The vehicle detecting system of claim 1, wherein the system is applied in the vehicle, and both the first camera and the second camera are located in the vehicle.

5. The vehicle detecting system of claim 1, wherein the vehicle detecting system is applied in a mobile phone, the mobile phone comprises the first camera, and the second camera is located in the vehicle and sends the captured image to the mobile phone.

6. The vehicle detecting system of claim 1, wherein the dangerous driving condition comprises that the vehicle was overtaking other vehicles or changing lanes.

7. A vehicle detecting method adapted for a vehicle, the method comprising:
   detecting a speed of the vehicle at real time;
   when a change of the speed within a first predefined time period is greater than a preset value, detecting a direction of the vehicle;
   when a change of the direction is greater than a preset angle, controlling a first camera to capture a first image in the front of the vehicle and a second camera to capture a second image at the back of the vehicle, wherein the vehicle is regarded as in a safe driving before the change of the direction, and both the first camera and the second camera captures the first image and the second image in the safe driving condition;
   when the direction is adjusted to a direction in the safe driving condition, controlling the first camera to capture a third image in the front of the vehicle and the second camera to capture a fourth image at the back of the vehicle;
   determining whether or not the two images from the first camera are the same and the two images from the second camera are the same;
   when the two images from both the first camera and the second camera are different, recording a dangerous driving condition of the vehicle and counting times of the dangerous driving condition within a second predefined time period; and
   when the times of the dangerous driving condition of the vehicle with the second predefined time period reaches a preset number of times, outputting a warning to prompt a driver.

8. The vehicle detecting method of claim 7, wherein the image comprises a license number.

9. The vehicle detecting method of claim 7, wherein the safe driving condition comprises that the direction of the vehicle is not changed or a change of the direction is small all the time.

10. The vehicle detecting method of claim 7, wherein both the first camera and the second camera are located in the vehicle.

11. The vehicle detecting method of claim 7, wherein a mobile phone comprises the first camera, and the second camera is located in the vehicle and sends the captured image to the mobile phone.

12. The vehicle detecting method of claim 7, wherein the dangerous driving condition comprises that the vehicle was overtaking other vehicles or changing lanes.

13. A computer-readable storage medium encoded with a computer program, the program comprising instructions that when executed by one or more computers cause the one or more computers to perform operations for detecting a vehicle, the operations comprising:

detecting a speed of the vehicle at real time;

when a change of the speed within a first predefined time period is greater than a preset value, detecting a direction of the vehicle;

when a change of the direction is greater than a preset angle, controlling a first camera to capture a first image in the front of the vehicle and a second camera to capture a second image at the back of the vehicle, wherein the vehicle is regarded as in a safe driving condition before the change of the direction, and both the first camera and the second camera captures the first image and the second image in the safe driving condition;

when the direction is adjusted to a direction in the safe driving condition, controlling the first camera to capture a third image in the front of the vehicle and the second camera to capture a fourth image at the back of the vehicle;

determining whether or not the two images from the first camera are the same and the two images from the second camera are the same;

when the two images from both the first camera and the second camera are different, recording a dangerous driving condition of the vehicle and counting times of the dangerous driving condition within a second predefined time period; and when the times of the dangerous driving condition of the vehicle with the second predefined time period reaches a preset number of times, outputting a warning to prompt a driver.

14. The computer-readable storage medium encoded with a computer program of claim 13, wherein the image comprises a license number.

15. The computer-readable storage medium encoded with a computer program of claim 13, wherein the safe driving condition comprises that the direction of the vehicle is not changed or a change of the direction is small all the time.

16. The computer-readable storage medium encoded with a computer program of claim 13, wherein both the first camera and the second camera are located in the vehicle.

17. The computer-readable storage medium encoded with a computer program of claim 13, wherein a mobile phone comprises the first camera, and the second camera is located in the vehicle and sends the captured image to the mobile phone.

18. The computer-readable storage medium encoded with a computer program of claim 13, wherein the dangerous driving condition comprises that the vehicle was overtaking other vehicles or changing lanes.

* * * * *